F. SMITH AND T. H. BRITTAIN.
TIRE CASING CORE.
APPLICATION FILED APR. 8, 1920.
1,366,750.
Patented Jan. 25, 1921.
3 SHEETS—SHEET 1.
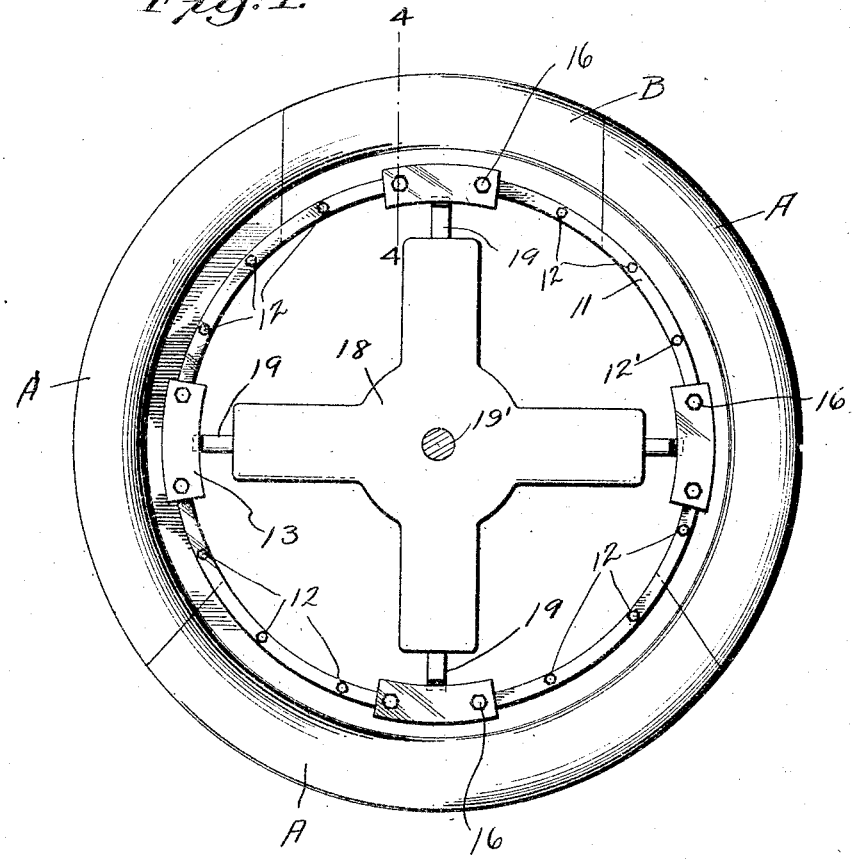
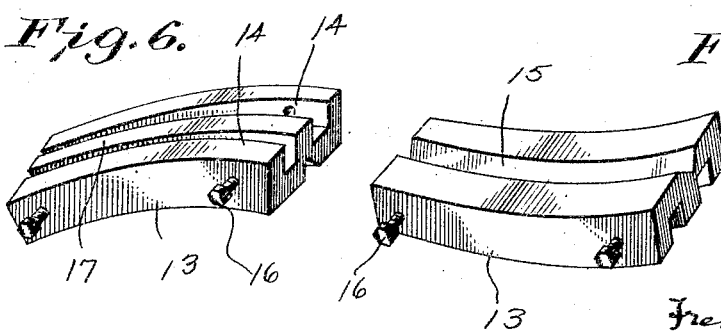

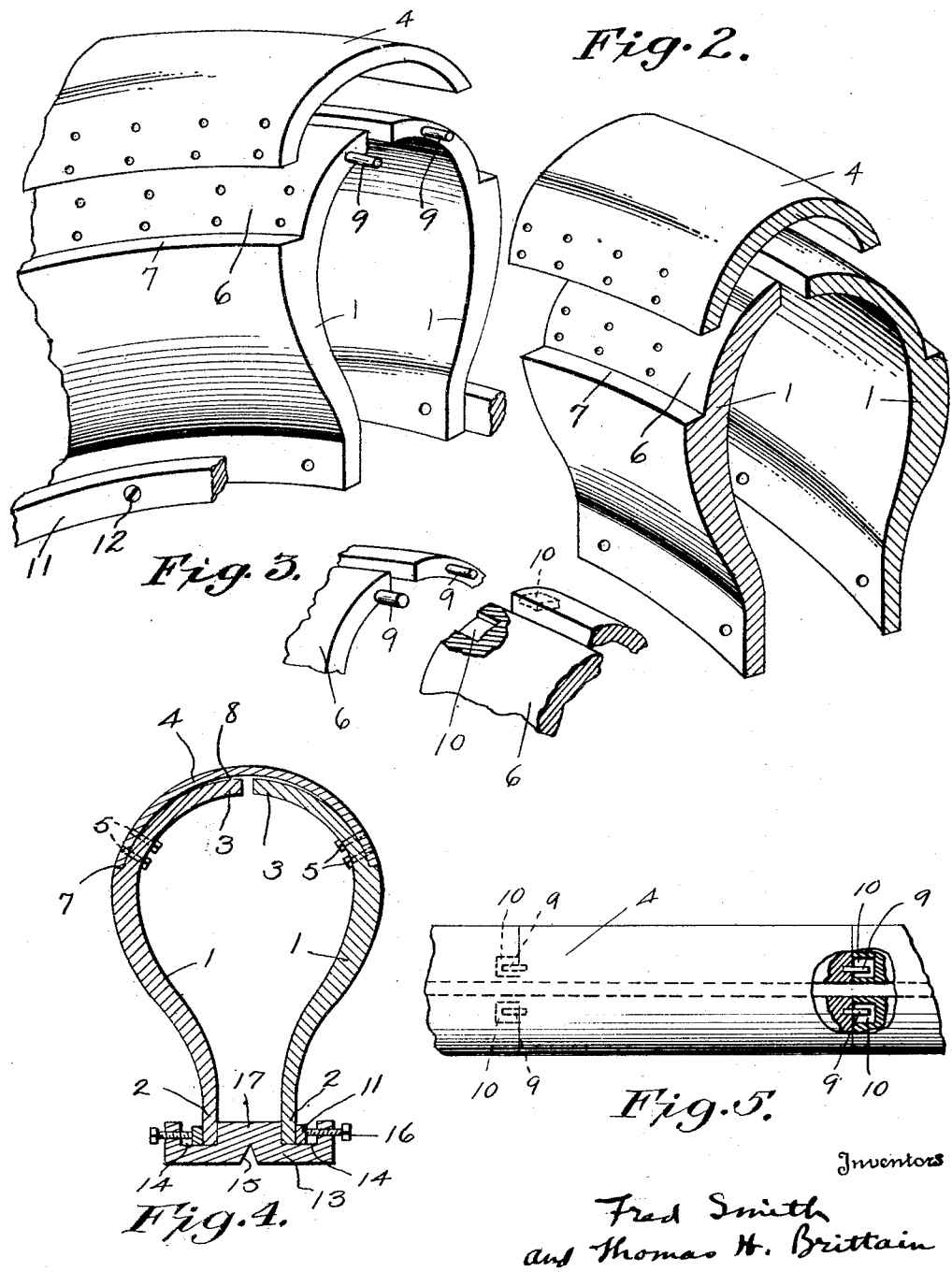

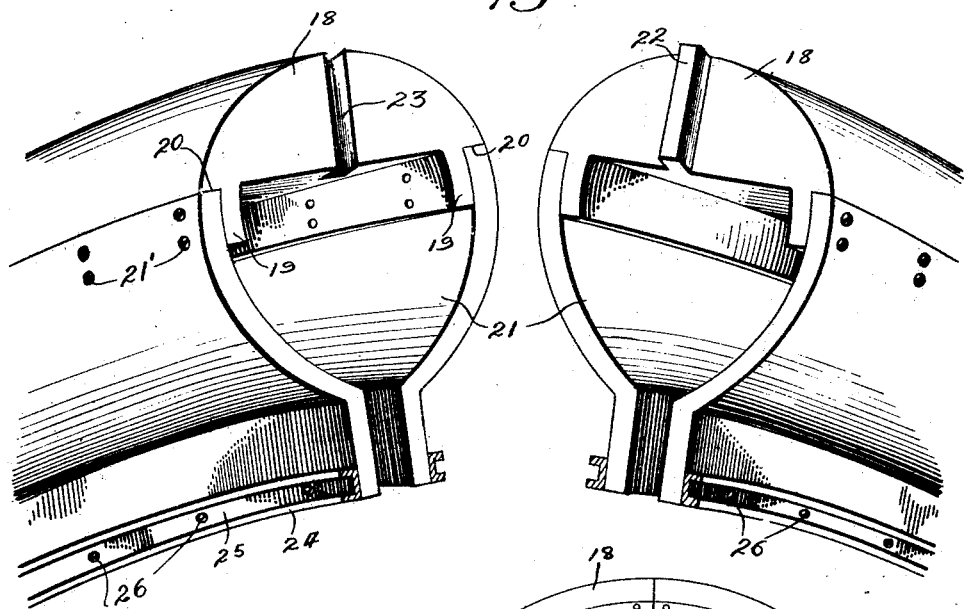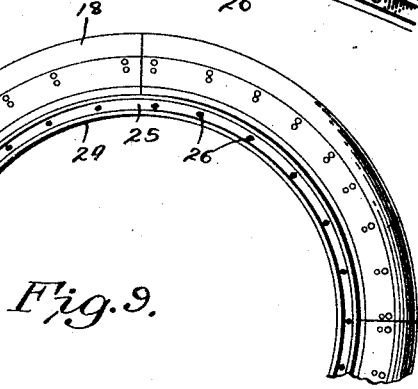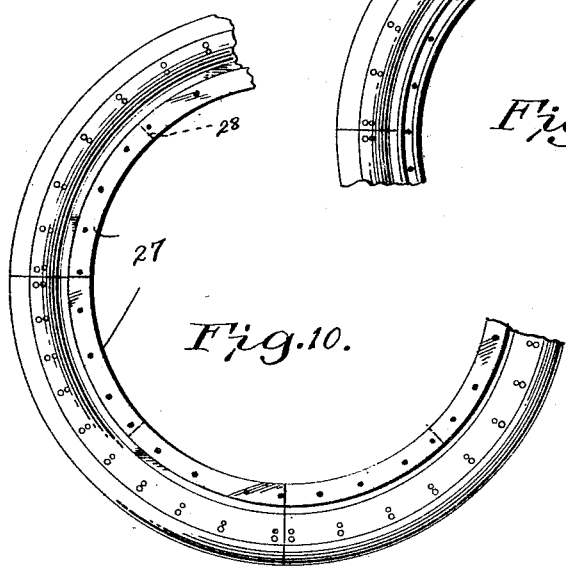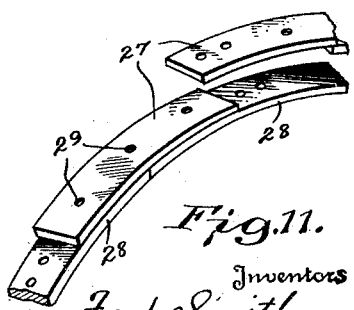

UNITED STATES PATENT OFFICE.

FRED SMITH AND THOMAS H. BRITTAIN, OF AKRON, OHIO.

TIRE-CASING CORE.

1,366,750.  Specification of Letters Patent.  Patented Jan. 25, 1921.

Application filed April 8, 1920. Serial No. 372,308.

*To all whom it may concern:*

Be it known that we, FRED SMITH and THOMAS H. BRITTAIN, citizens of the United States, and residents of Akron, in the county of Summit and State of Ohio, have invented certain new and useful Improvements in Tire-Casing Cores, of which the following is a specification.

Our invention relates to cores used in the manufacture of automobile tire casings, and more particularly to a core having resilient qualities.

It is desirable in the manufacture of tire casings to provide a core member which, when the vulcanizing mold is placed around the layers of fabric and rubber to vulcanize and unite the same, and pressure applied thereto will expand and force the core against the casing with an even pressure. Various means have been employed for accomplishing this result, and it is customary to provide a core member formed of spring metal which is adapted to be expanded and force the tire casing against the mold.

There are disadvantages, however, in structures of this type, in that the ordinary spring core does not exert a uniform pressure upon the casing and thereby imperfect areas are formed in the casing.

Our invention is designed to accomplish all of the advantages present in a spring core, and at the same time provide a core which is more substantial and durable. In accomplishing our result, we provide the core member in sections. Each section comprises three parts adapted when combined to form a body portion upon which the tire casing is to be formed. One or two parts of each section are formed of spring metal to supply the proper resiliency.

Various objects will appear in the specification and drawings, in which—

Figure 1 is a side elevation of our core, with its support, for insertion into the molding machine;

Fig. 2 is a perspective view of the ends of two of the sections, partly separated;

Fig. 3 is a fragmentary perspective view, showing the pin and slot connection for the ends of the sections;

Fig. 4 is a section on line 4—4 of Fig. 1;

Fig. 5 is a fragmentary plan view of the device;

Figs. 6 and 7 are perspective views of the mold supporting guides;

Fig. 8 is a fragmentary perspective view of the modified form of our invention;

Fig. 9 is a fragmentary side elevation showing a modified form of the securing ring;

Fig. 10 is a fragmentary side elevation showing another modification of the securing ring and Fig. 11 is a fragmentary perspective view of the form of ring shown in Fig. 10.

In the drawings the core is shown as composed of four sections, three of these sections A, being of equal length, and a key section B (Fig. 1) being adapted to be inserted last to facilitate the easy assembling of the core.

We will now refer more particularly to the form of our invention illustrated in Figs. 1 to 7. Each section of the core is formed of three parts. Numeral 1 indicates cast metal side members, which, in cross-section, conform in design to the cross-section of an automobile tire casing. The lower ends 2 of these side members 1 are formed substantially parallel, for the purpose to be hereinafter described. The side members at their upper ends terminate short of the center, as shown at 3, leaving a space between their edges.

A plate 4, corresponding to the tread portion of the automobile tire casing, unites the ends 3 of the side members and is secured to the side members in any suitable manner, here shown by bolt and nut connections 5. The side members 1 are recessed as shown at 6, for the reception of the plate 4, and the recess 6 provides a shoulder 7 against which the edge of the plate 4 is adapted to abut. Each side member 1 is similarly recessed and provided with a shoulder 7, and it will be seen by an examination of Fig. 4 that with this structure the plate 4 forms a continuous and even surface against which the tire casing is adapted to lie.

As hereinbefore stated, the plate 4 (hereinafter termed the tread plate) is of spring metal and is of sufficient width so that when positioned upon the side members 1 it will be bowed away from the ends 3 of the side members 1 to provide the space 8, as shown very clearly in Fig. 4.

It is obvious, therefore, that each of the sections A and the section B can be formed in this manner, providing four separate sections which, when assembled, will form a core member around which the fabric and rubber of the tire casing are adapted to be molded. As shown in Fig. 1, we desire to form three of these sections (marked A in the drawings) of equal length, forming the fourth section (marked B) of a smaller length. In this way we facilitate the assembling of the core, the sections A being joined first and then the key section B being inserted to complete the core. In order to form a connection between the abutting ends of the sections, we wish to provide the end of one section with pins 9, shown more particularly in Figs. 2 and 3. These pins are adapted to project into slots 10, formed in the adjacent edge of the next section. Thus, it will be seen that with this pin and slot connection a limited degree of radial movement is allowed but independent vertical movement of the sections with respect to each other is prevented.

After the mold has been assembled as described thus far, we wish to more securely unite the sections by providing the continuous ring member 11, which is secured to the parallel ends 2 of the side members 1 by means of screws 12. Thus, it will be seen that the inner edges are rigidly united, forming a continuous core, while the outer portions of the core are connected in a manner which allows certain radial movement, but prevents independent displacement of the core sections.

From the structure described thus far, it is evident that when the tire casing is formed upon the core member and pressure applied thereto, the vertical pressure upon the plate 4 will tend to force this plate down against the ends 3 of the side members 1, which members in turn will spread transversely and thereby force the core out against the casing at all points.

In order to secure the core as rigidly as possible, when the tire casing is being built up upon the core, we provide guide members 13. These members are formed with two channels 14 upon their inner face and a V-shaped groove 15 extending longitudinally upon their outer face. In Fig. 1 we have shown four of these members. By referring to Fig. 4 it will be seen that the depending ends 2 of the side members 1 are positioned in the channels 14. These channels 14 are of sufficient width to allow movement of the depending ends 2 transversely of these guide members 13. Set screws 16 are positioned in the sides of the guide members 13 and extend through to the channels 14. By forming the channels 14 a central ridge 17 is provided. Therefore, it is obvious that when we desire to rigidly secure the mold, it is only necessary to operate the set screws 16 and force the ends 2 of the core members against the ridge 17, which forms a central abutment for the ends 2. In this manner the core is made rigid to facilitate the easy assembling of the fabric and rubber in building up the tire casing.

In order to provide means for supporting the core member to facilitate the forming of the tire casing thereon, we provide a supporting spider 18 which is provided with four arms 19 which enter the V-shaped grooves 15 in the guides 13. This supporting spider may be mounted in any suitable manner such as an axle 19′ or in any desired manner to enable the user to conveniently build up the tire casing upon the mold. As is usual in a spider construction of this type, arms 19 are made adjustable, but as this forms no part of our invention, this detail is not illustrated. It is evident, however, that by adjusting the arms 19 so as to tightly press the same against the guides 13 that the core member will be securely held thereto, and we can thereafter release the ends 2 of the core member by unscrewing the set screw 16 to thereby allow these ends to spread transversely of the guide member 13. This spreading movement is possible by reason of the width of the channels 14.

From the foregoing it is evident that the tire casing may be built up upon the core in the usual manner, the core being rigidly held by the guide members 13. When the casing has been completely formed upon the core, with the casing inserted into the molding machine, the set screws will be released, allowing the maximum of movement of the core member. As the pressure of the molding machine is applied to the casing, the core member will spread radially by reason of the pressure exerted by the spring plate 4. It is obvious that because of the space 8 between the plate 4 and the upper ends of the side members 1, and also of the space between the ends 3 of these side members 1, the desired radial expansion of the core may be had, and because of the comparative rigidity of the side members 1, the pressure exerted radially will be uniform. Also, by allowing the transverse movement of the lower ends 2 of the core, the proper pressure may be exerted upon the lower edges of the tire casing.

Referring now more particularly to Figs. 8 and 9, we will describe a modified form of our core member. In this type we form the tread portion 18 of cast metal substantially semi-spherical in shape. Formed integrally on the lower face of this member 18 and adjacent the outer edges thereof, we provide depending flanges 19. By forming these flanges adjacent the edges of the member 18, we provide a recess which forms the shoulders 20. The sides of the core member in this form are numbered 21 and are formed of spring metal. The upper edge of the side plates 21 is adapted to rest in these recesses and abut the shoulders 20.

These side plates may be secured to the depending flange 19 in any suitable manner such as screws 21'. It is seen by this structure we are able to provide an unbroken outer surface against which the casing may be formed.

In order to prevent a transverse displacement of the mold sections we provide on the abutting edge of one section a lug 22 adapted to enter the groove 23 on the abutting face of the next section. By this structure a vertical movement of the core sections is allowed but independent transverse movement is prevented.

Means are provided also for integrally securing the four sections of the mold together at the inner edges thereof and in this form we have shown an integral ring numbered 24 shown clearly in Figs. 8 and 9. This ring member is substantially U-shaped and provided with a channel 25 which is adapted to receive the heads of the bolts 26 which are employed for securing these rings to the core sections.

Referring now more particularly to Figs. 10 and 11 we will describe another form of a ring member. In this form we provide the ring member of eight sections, four of these sections 27 being superimposed upon the other four sections 28 and in staggered relation thereto. These ring sections may be joined together in any suitable manner such as rivets 29. By referring to Fig. 11 the exact arrangement of these ring sections will be more clearly set forth, it being more evident that the joints of the lower sections are bridged by the four upper sections.

The operation of this modified form of our tire core is substantially as follows: The pressure of the vulcanizing mold is applied to the outer edge of the core which tends to bow the spring metal side members and thereby impart a uniform radial pressure to the tire casing.

The operation of both forms of our core is substantially alike, the only difference being the relative position of the cast metal portions to the spring metal portions. The principle of operation is precisely the same and the results obtained are likewise the same.

It is obvious also that by forming the tire core in sections, and each section in three parts, such a core is more economical and efficient, in that worn parts may be more easily replaced, without the necessity of providing a wholly new core. It should also be noted that the outer surface of the core is continuous and unbroken, because of the recesses provided in the cast metal side members 1 of the preferred form and the cast top member 18 of the modified form.

The resilient plates 4 and 21 which rest in these recesses form, with the side stop members 1 and 18 the continuous surface necessary in core members, and also provide the resilience for the entire structure. It is evident from the foregoing that should we desire we could use a greater number of guide members 13.

Various changes and modifications of our invention may be made, without departing from the spirit and scope of the same.

Having thus described our invention what we claim is:—

1. A tire molding core formed in sections, each section comprising three members, one or more of said members being resilient, said members conforming in cross-section to the shape of an automobile tire casing, as and for the purpose set forth.

2. A tire molding core formed in sections, each section being composed of three parts joined together to correspond in cross-section to an automobile tire casing, one or more of said parts being resilient, substantially as described.

3. A device of the class described, comprising side members, a member connecting the side members at one edge thereof, said connecting member being resilient, as and for the purpose set forth.

4. A tire molding core formed in sections, each section consisting of two side members connected along their upper edges by a resilient connecting plate, and integral ring members secured adjacent the lower edges of said sections, as and for the purpose set forth.

5. A tire molding core, consisting of sections, each section comprising two cast metal side members having recesses along their upper edges, a resilient metal plate fitting in said recesses and connecting said side members, means for preventing displacement of abutting edges of the sections, and integral rings secured to the lower edges of said side members, substantially as described.

6. An automobile tire-forming core composed of sections, each section comprising two non-resilient side members recessed along their outer edges, a resilient plate secured in said recesses and connecting the outer edges of said side members and forming therewith a continuous bearing surface, pin and slot connections for preventing displacement of the abutting edges of said sections, additional means for uniting the sections at their inner edges, and guide members disposed upon said inner edges, as and for the purpose set forth.

7. A core member for forming automobile tires, composed of removable sections, each section being formed with two non-resilient side plates, said side plates being recessed along their outer edges and forming shoulders thereby, a resilient connecting plate secured in said recess and abutting the shoulder formed by said recess, said plate forming with said side plates a continuous surface, means on the abutting edges of said core sections for preventing independent vertical displacement of the same, additional means for rigidly uniting the sections at their inner ends, guide members disposed on the inner edges of said sections, said guide members being provided upon one face thereof, with guideways for the reception of the edges of the core, and V-shaped grooves on the other faces of said guides, as and for the purpose set forth.

FRED SMITH.
THOMAS H. BRITTAIN.